United States Patent [19]

Jones

[11] Patent Number: 5,841,773
[45] Date of Patent: Nov. 24, 1998

[54] ATM NETWORK SWITCH WITH CONGESTION LEVEL SIGNALING FOR CONTROLLING CELL BUFFERS

[75] Inventor: Trevor Jones, Maldon, United Kingdom

[73] Assignee: General DataComm, Inc., Middlebury, Conn.

[21] Appl. No.: 644,308

[22] Filed: May 10, 1996

[30] Foreign Application Priority Data

May 10, 1995 [GB] United Kingdom ................... 9509484

[51] Int. Cl.$^6$ ...................................... H04J 3/24
[52] U.S. Cl. ........................ 370/395; 370/235; 370/462; 370/468
[58] Field of Search ................................... 370/352, 235, 370/232, 230, 395, 401, 461, 462, 468, 474

[56] References Cited

U.S. PATENT DOCUMENTS

| | | | |
|---|---|---|---|
| 5,031,139 | 7/1991 | Sinclair | 364/900 |
| 5,113,398 | 5/1992 | Howes | 371/11.2 |
| 5,241,536 | 8/1993 | Grimble et al. | 370/60.1 |
| 5,251,209 | 10/1993 | Jurkevich et al. | 370/468 |
| 5,285,441 | 2/1994 | Bansal et al. | 370/16 |
| 5,287,346 | 2/1994 | Bianchini, Jr. | 370/60 |
| 5,291,482 | 3/1994 | McHarg et al. | 370/60 |
| 5,299,191 | 3/1994 | Boyer et al. | 370/60.1 |
| 5,315,581 | 5/1994 | Nakano et al. | 370/16 |
| 5,319,638 | 6/1994 | Lin | 370/60 |
| 5,347,514 | 9/1994 | Davis et al. | 370/60 |
| 5,365,519 | 11/1994 | Kozaki et al. | 370/60 |
| 5,367,643 | 11/1994 | Chang et al. | 395/325 |
| 5,369,635 | 11/1994 | Gandini et al. | 370/60.1 |
| 5,436,893 | 7/1995 | Barnett | 370/395 |
| 5,526,344 | 6/1996 | Diaz et al. | 370/462 |
| 5,689,500 | 11/1997 | Chiussi et al. | 370/235 |
| 5,691,985 | 11/1997 | Lorenz et al. | 370/401 |

FOREIGN PATENT DOCUMENTS

| | | | |
|---|---|---|---|
| 0 338 558 A2 | 10/1989 | European Pat. Off. | H04L 11/20 |
| 2272820 | 5/1994 | United Kingdom | H04L 12/56 |

*Primary Examiner*—Douglas W. Olms
*Assistant Examiner*—Shick Hom
*Attorney, Agent, or Firm*—David P. Gordon; David S. Jacobson; Thomas A. Gallagher

[57] ABSTRACT

An ATM network switch is provided with a switch fabric linking a plurality of slot controllers. Each slot controller receives ATM cells from an external data link and has at least one input port to the switch fabric. The switch fabric switches a data cell received from any one port to one or more other ports. Each slot controller is provided with a separate group of buffers for each slot controller in the switch, and stores ATM cells intended for those other slot controller in the buffers. Each group of buffers includes a separate buffer for each class of cell traffic, so that the ATM cells are stored by intended slot controller and by class. The slot controller also includes a buffer control circuit which controls the passing of cells from the buffer to the switch fabric. The switch fabric includes input FIFOs, an indication of the fullness of which is measured and signaled back to the buffer control circuit. In response to the feedback signal which is an indication of the congestion level of each switching path through the switch fabric from one port thereto to another, the buffer control circuit controls the output of cells from the slot controller buffers to the switch.

18 Claims, 3 Drawing Sheets

ATM NETWORK SWITCH WITH CONGESTION LEVEL SIGNALING FOR CONTROLLING CELL BUFFERS

BACKGROUND OF THE INVENTION

1. Field of the Invention

This invention relates to an asynchronous transfer mode (ATM) network switch. More particularly, this invention relates to improvements in the buffering of the flow of cells through an ATM network switch.

2. State of the Art

In an ATM switch of the cross-point type, it is known in the art to provide a buffer in the form of FIFO between each input port or slot controller and the switch fabric. Each FIFO provides a fullness level signal to indicate whether or not the FIFO is full. These level signals are ORed, so that, if any of the FIFOs is full, no data is sent from the slot controllers to the switch fabric. The result of such an arrangement is that the flow rate of the cells is limited where any one data path is blocked.

As an improvement to the standard buffering system of the art, it has been proposed in UK Patent Application GB 2272820A to Fischer et al. to provide each input port server with a plurality of buffer stores corresponding to the plurality of output port servers at the output of the switch. While such an arrangement is somewhat effective in freeing the flow of data through the switch when one particular data path is blocked, the arrangement does not actively or effectively manage the flow of data through the switch in congested situations.

SUMMARY OF THE INVENTION

It is therefore an object of the invention to provide an ATM network switch with improved data flow characteristics.

It is another object of the invention to provide an ATM network switch with data buffers for each class of data traffic being handled.

It is a further object of the invention to provide an ATM network switch with input buffers where congestion is handled, and data flow is improved by providing a feedback signal from the switch fabric to the input buffers.

In accord with the objects of the invention, an ATM network switch is provided and broadly includes a switch fabric, and a plurality of slot controllers, each having at least one input port coupled to the switch fabric. The switch fabric comprises means for switching a data cell input on any one port to a selected one or more of the other ports thereto. The slot controllers comprise cell receiving means for receiving ATM cells from a least one external data link, cell transmitting means for transmitting ATM cells outwardly on each external data link, a plurality of cell buffer means with at least one buffer means for each other slot controller in the switch, and buffer control means for controlling the passing of cells from the buffer means to the input port to the switch fabric. The buffer control means is coupled to signalling means in the switch fabric for signalling back to the buffer control means in each slot controller an indication of the congestion level of each switching path through the switch fabric from one port thereto to another. In this manner, the buffer control means controls the output of cells from the buffer means in accordance with the congestion levels signalled.

Preferably, the switch fabric comprises a plurality of switching elements. Each switch element is arranged to receive copies of all cells input to the switch, to read a switch fabric header code added to the cell by the receiving slot controller, and to pass only those cells whose code is correct for the particular element. The switching elements are suitably in the form of ASICs, and each may be provided with an input buffer in the form of a FIFO, suitably of 4-cell capacity, for each input to the ASIC from the slot controllers. The FIFOs are preferably of the type providing a FIFO fullness (level) signal indicating the number of cells contained therein. This may thus be a two-bit signal, and these two-bit signals are output to the appropriate slot as thirty-two serial bits (for a 16×16 port switch), representing the status of all the FIFOs in the switch fabric for the particular input slot. The FIFO level signals are preferably used as an input to arbitration logic, which is arranged to determine which is the next cell to be sent to the switch fabric from the slot controller.

Preferably, the arbitration logic comprises a separate cell finder for each priority level (e.g., four cell finders for four cell priority levels). The cell finders are preferably arranged to look at the state of the FIFOs comprising the slot controller's buffer means in a sequential fashion to find the next cell at its own priority level ready to be sent to the switch fabric. The cells are sent according to priority level. However, in accord with a preferred aspect of the invention, timer means ensure that, even if there are top priority cells waiting to be sent, the lower priority cells are not delayed beyond a predetermined time.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
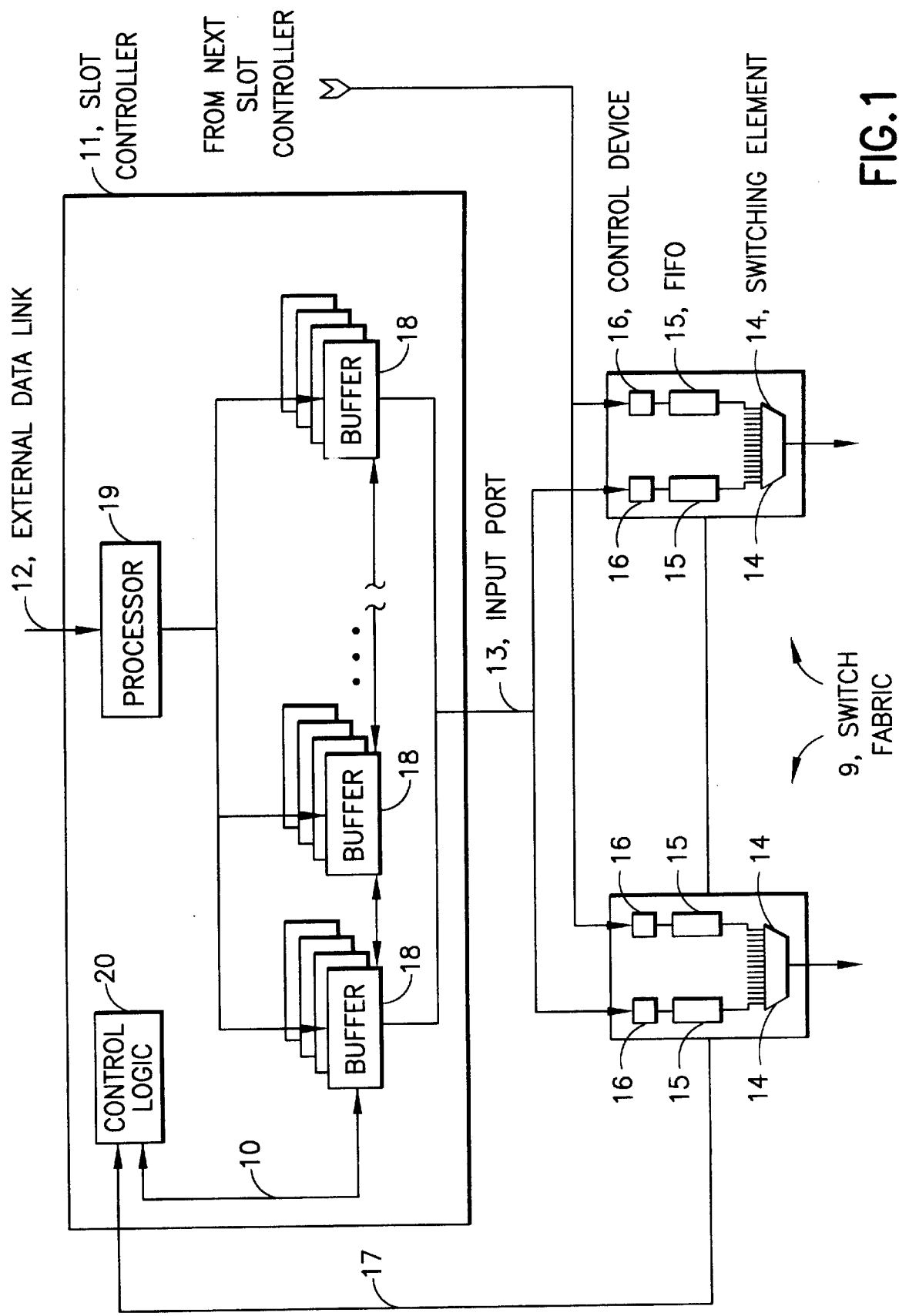
FIG. 1 is a diagrammatic representation of a slot controller and a portion of the switch fabric of a network switch in accord with the invention.

In accord with the invention, an ATM switch comprises a switch fabric 9, and a plurality (e.g., sixteen) of slot controllers 11, of which only one is illustrated in FIG. 1 for the sake of clarity. Each slot controller 11 has at least one external data link 12, and connections to an input port 13 and an output port (not shown) of the switch fabric 9. The switch fabric 9 comprises a plurality (e.g., sixteen) switching elements 14, of which only two are illustrated in FIG. 1, again for the sake of clarity. It will be appreciated that the switch may comprise a greater or smaller number of inputs than illustrated, and thus require more or fewer than sixteen slot controllers and switching elements. Each switching element 14 is preferably embodied in the form of an ASIC, and preferably includes a 4-cell FIFO 15 and a control device 16 for each of the input ports 13. The function of the control device 16 is to determine from a switch fabric header added to the cell by the slot controller processor means 19 (as described hereinafter) whether or not the cell should be written to the associated FIFO 15 or discarded. Only those cells whose switch fabric headers identify them as intended for the output port with which the ASIC is associated are thus allowed to pass to that particular port. Each FIFO 15 is arranged to send a two-bit signal back via line 17 to an arbitration logic 20 in the respective slot controller 11 which indicates the fullness of (i.e., number of cells being presently stored in) the FIFO (e.g., zero, one, two, or three or four). The manner in which this is done is described hereinafter in more detail with reference to FIG. 2, while the operation of the arbitration logic is described in more detail with reference to FIG. 3.

Within each slot controller 11, additional buffering is provided by means of a plurality of sets of FIFOs 18; one set for each output port or destination on the switch fabric, and each set including a separate FIFO for each class of traffic. Thus, in the example illustrated, each set of FIFOs includes four FIFOs 18 to cover four different classes of cell traffic. In some circumstances fewer, or possibly more, classes of cell traffic may be provided, and thus the numbers of FIFOs in the set may be different. Regardless, each FIFO can hold a plurality of cells, with a single FIFO potentially holding cells from a plurality of different VCs (Virtual Connections). Each of the FIFOs in the sets 18 is arranged to send, on a serial line 10 to the arbitration logic 20, a one-bit signal to indicate whether a cell is waiting to be sent to the switch fabric. With sixteen slots and four levels of priority, sixty-four bits of information are thus generated to be sent on line 10.

The slot controller 11 comprises a processor means 19 for routing incoming cells on the external data line 12 to the appropriate FIFO according to destination and priority, as indicated by the routing information in the cell headers. "Priority 0" cells, the highest priority, will normally be sent to the switch fabric in preference to cells of lower priority, while "Priority 3" cells are of the lowest priority and will only normally be sent when there are not higher priority cells to be sent. The processor means 19 reads the destination and priority coding in the header of each incoming cell received from the external link in a manner described in more detail in co-owned UK Patent Published Application No. 2287854, which is hereby incorporated by reference herein in its entirety, and adds to the cell a switch fabric header, which indicates the destination output port from the switch fabric. The processor means 19 then routes the cell with the header to the appropriate FIFO 18 to await transmission to the switch fabric.

Figure 2:
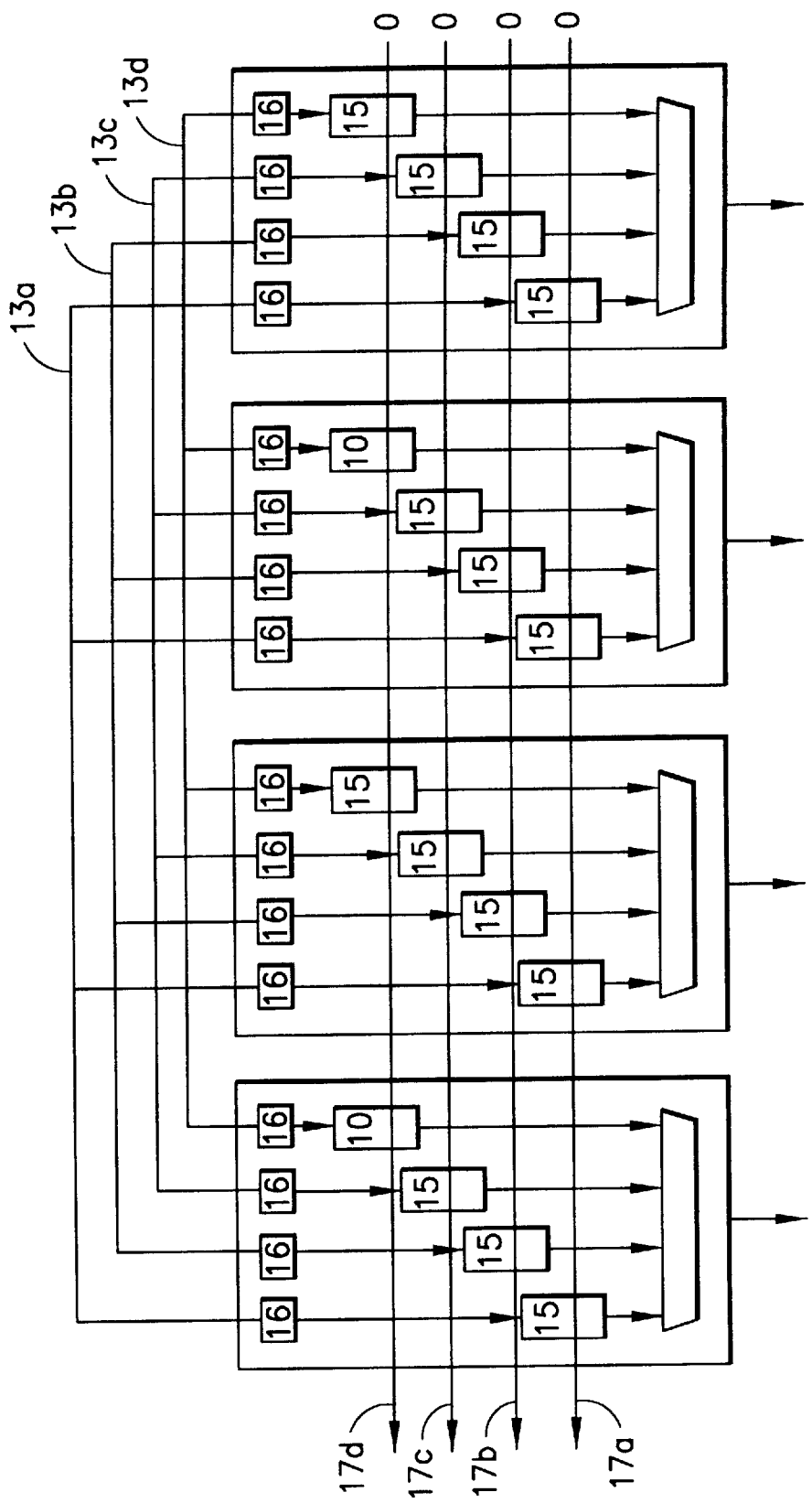
FIG. 2 is a diagrammatic representation of a portion of the switch fabric showing the structure in more detail of the switch fabric in more detail.
Figure 3:
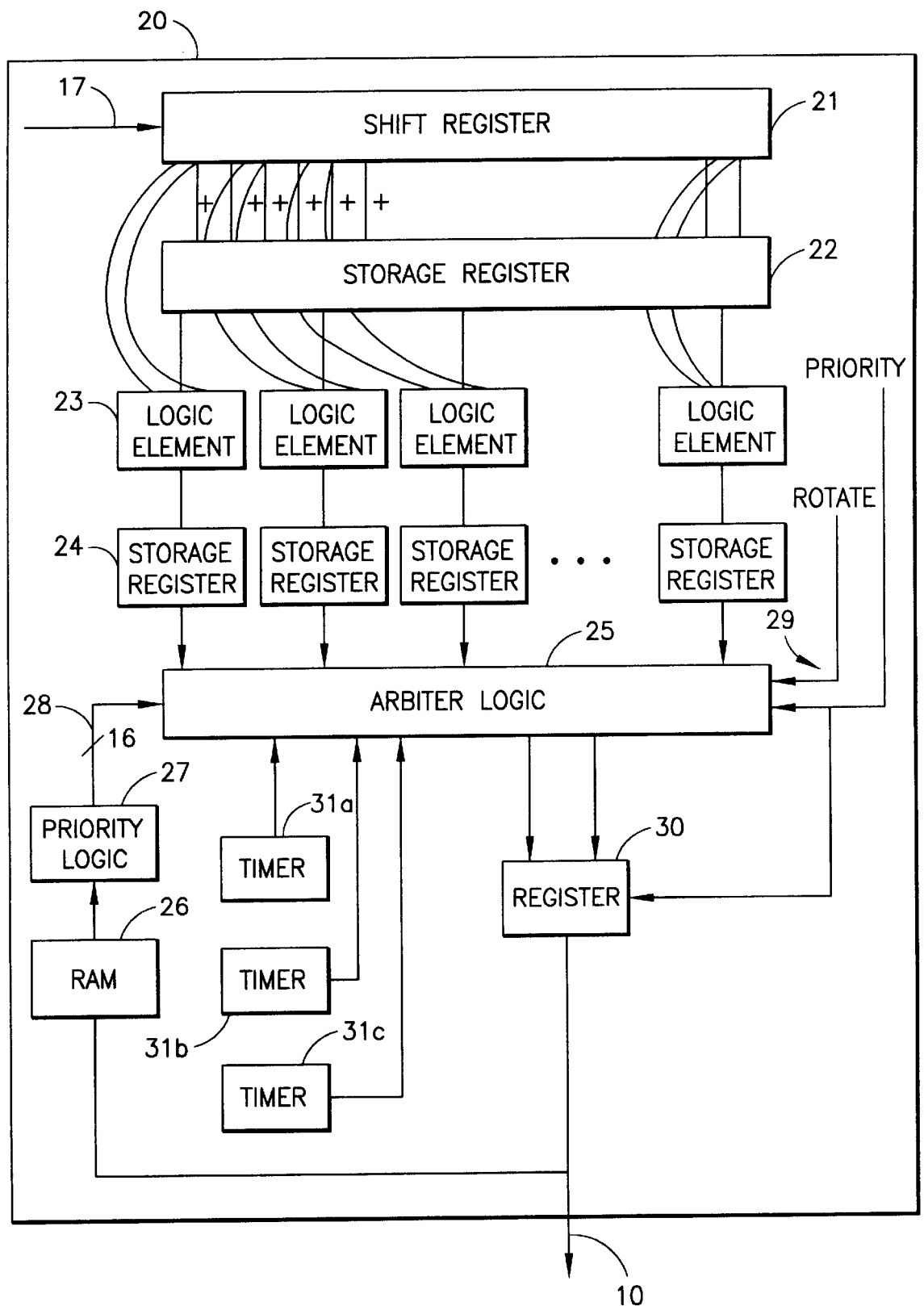
FIG. 3 is a diagrammatic representation of the arbitration logic forming part of the slot controller shown in FIG. 1.

FIG. 2 shows diagrammatically how the levels of the FIFOs 15 are signalled back to the slot controllers. For the sake of clarity, a four slot switch fabric is illustrated, but the principles of operation are the same for a larger switch. The ASICs 14 each have a timing synchronization signal and a two-bit register (not shown) on each FIFO level line 17, each line 17a–d respectively being connected to the two-bit register for the FIFO 15 associated with the respective one of the input ports 13a–d from the four slot controllers (in this case—in the embodiment described with reference to FIGS. 1 and 3, sixteen slot controllers are provided, so that there will be four times as many components). On receipt of the synchronization pulse the registers are loaded with the two-bit level signal, and these registers together act as a shift register on each line 17. With each line 17 grounded at one end to provide a zero (0) input, the shift registers each add their two bits in serial form, resulting in an eight-bit output on each line 17a–d, representing the levels of the four FIFOs associated with the respective input port 13a–d. In the case of the sixteen-slot arrangement illustrated in FIGS. 1 and 3, a thirty-two-bit register entry for the sixteen switching elements would be shifted out to the slot controller 11.

The arbitration logic 20 within the slot controller determines the order of transmission of the cells from the FIFOs 18 to the switch fabric. As may be seen more clearly from FIG. 3, the arbitration logic 20 preferably comprises a thirty-two-bit shift register 21 which receives the thirty-two-bit level signal from the switch fabric on line 17 for the particular slot controller. Every thirty-two clock intervals of the system clock, the contents of this register 21 are loaded into a thirty-two-bit storage register 22, representing the "OLD" values. Sixteen decision logic elements 23 are each arranged to take two bits from the OLD register 22 and the corresponding two bits from the shift register 21 and to perform a comparison. As a result of the comparison, the decision logic elements 23 output a "1" or a "0", indicating OK or NOT-OK for the ability of the particular buffer 15 to receive another cell. The decision logic elements carry out a process which looks at the direction of change in the FIFOs 15, since pipelining in the system means that the data is already out of date when it arrives at the logic 20. The logic elements 23 each generate a respective Cell Available (OK/NOT-OK) flag for each FIFO 15 according to predetermined rules. For example, if the count is zero or one, and OK-to-send flag is generated; and if the count is two and was previously three, an OK flag is again generated. However, if the count has remained at two, has gone from one to two, or is at three, then a "Not-OK" flag is generated. Each of these sixteen flags is stored in a respective single-bit storage register 24. As each new string comes in, the comparison is carried out so as to generate the new set of flags, as described, and then the new values are stored. The flags are supplied to a rotating priority arbiter logic 25, whose operation is described hereinafter.

The sixty-four bits indicating the status of the FIFOs 18 arrive on line 10 and are stored in RAM 26, before being processed by priority logic 27, which looks at the signals representing one slot (four priorities) in turn and outputs a three-bit signal made up of two bits representing the highest priority level present in four FIFOs of the set 18, and one bit as a valid signal which is set to "1" if all the FIFOs in the set are not empty (and "0" if all the FIFOs in the set are empty). The logic element 27 thus receives sixty-four bits and outputs a three-bit signal on each of sixteen lines 28 to the priority arbiter logic 25.

The priority arbiter logic 25 is arranged to process each of the slots in turn, shifting the start point by one slot each processing cycle; a rotate signal input on line 29, from a simple four-bit counter (not shown) being used to cause the shift. The shifting is provided to ensure that the arbitration process does not result in any one slot being "favored" over the other slots, with its FIFOs being selected more frequently. The logic 25 looks at the sixteen three-bit inputs on the lines 28 and selects those in which the third bit is "1", indicating a cell present in the respective FIFO set 18. The logic then looks at all of the three-bit signals which show "level 3" priority as being the highest available priority, performs a logical AND process with the OK/NOT-OK values, and outputs a 4-bit signal representing the identifying number of the first FIFO set 18 found for which the relevant FIFOs 15 in the switch fabric have signalled availability to receive cells. This signal is stored in a holding register 30, along with two bits identifying the priority within the set to be sent. Before this value is used, however, the process is repeated for each successively higher level or priority, and if an output is present, it overwrites the four-bit value in the register 30. Thus, the highest available priority is the one which remains in the register 30 to signal the output of the cell. A request signal is also generated by the logic 25 as a logical OR of the outputs, indicating that all the priorities have been examined and the request can be sent back on line 10 to release a cell to the switch fabric input port.

Three timers 31*a*, 31*b*, and 31*c*, one for each of the cell finders for priorities "1", "2", and "3", also provide one-bit inputs to the logic 25, to indicate a time-out for a particular priority level. "Priority 0" does not require a timer, as the priority level does not permit delay. The logic 25 causes "priority 0" cells to be transmitted first, but if the flow of these cells is such that no lower priority cells would be transmitted, the timers come into play causing transmission of the lower priority cell according to a predetermined timeout period for that level of priority. If, for example, a time-out signal is received for "priority 3", the order of processing the priorities is changed so that "priority 3" is processed last, rather than "priority 0", and is thus the operative code remaining in the register 30 at the end of the cycle.

The arrangement described can readily function with a dual switch fabric as described and claimed in co-owned application GB9607539.5, which is hereby incorporated by reference herein. Separate logic would be used for each switch fabric, and all the components described would be duplicated except for the priority timers and the logic 25, but this would generate an arbitration request and receive the grant back, as described in that application, before causing the cell to be sent.

There has been described and illustrated herein an ATM switch with a switch fabric and a plurality of slot controllers, where the slot controllers include buffer and arbitration means, and the switch fabric includes feedback means to the arbitration means of the slot controllers for providing information which is used by the arbitration means to decide which cells to send to the switch fabric. While preferred embodiments of the invention have been described, it is not intended that the invention be limited thereto, as it is intended that the invention be as broad in scope as the art will allow and that the specifications be read likewise. Thus, while the invention has been described with particular reference to a switch having a particular architecture with "slot controllers" and "switch fabric elements", it will be appreciated that the concepts of the invention may be applied to other switches where a plurality of processing means are provided for forwarding incoming ATM cells to a switch fabric. Likewise, while the particular switch described is provided with sixteen slot controllers, it will be appreciated that the invention applies to switches of different sizes. Further, while particular algorithms and arrangements for the arbitration logic have been provided, it will be appreciated that other arbitration schemes could be used. It will therefore be appreciated by those skilled in the art that yet other modifications could be made to the provided invention without deviating from its spirit and scope as so claimed.

I claim:

1. An ATM network switch coupled to a plurality of external data links, comprising:
   a) a switch fabric having a plurality of input ports; and
   b) a plurality of slot controllers, each of said slot controllers being coupled to one of said input ports of said switch fabric, each slot controller having cell receiving means for receiving ATM cells from at least one of the external data links, cell transmitting means for transmitting ATM cells outwardly on the external data link, a plurality of first buffer means for storing ATM cells, one of said first buffer means for each other slot controller in said ATM network switch, and buffer control means for controlling the passing of cells from said plurality of first buffer means to said one of said input sorts of said switch fabric, wherein
   said switch fabric comprises means for selectively switching a cell input on any one port to at least one other port thereto, and signalling means for providing a congestion signal back to said buffer control means in each slot controller an indication of the congestion level of each switching path through said switch fabric, such that said buffer control means controls the output of cells from said first buffer means in accordance with said congestion signals.

2. An ATM network switch according to claim 1, wherein:
   each of said plurality of first buffer means comprises a separate buffer for each class of ATM cell traffic handled by said switch.

3. An ATM network switch according to claim 1, wherein:
   said switch fabric comprises a plurality of switching elements each of which receives copies of all cells received by said switch, and each of which is arranged to read a switch fabric header code added to a cell by one of said plurality of slot controllers and to pass only those cells whose code is correct for that particular switching element.

4. An ATM network switch according to claim 2, wherein:
   said switch fabric comprises a plurality of switching elements each of which receives copies of all cells received by said switch, and each of which is arranged to read a switch fabric header code added to a cell by one of said plurality of slot controllers and to pass only those cells whose code is correct for that particular switching element.

5. An ATM network switch according to claim 1, wherein:
   said switch fabric comprises a plurality of switching elements, each switching element comprises a plurality of input buffers, with one input buffer for each of said plurality of slot controllers.

6. An ATM network switch according to claim 5, wherein:
   said signalling means comprises means for signalling an indication of the number of ATM cells in each of said input buffers.

7. An ATM network switch according to claim 5, wherein:
   each of said plurality of input buffers is a FIFO, accommodating up to four ATM cells.

8. An ATM network switch according to claim 4, wherein:
   each switching element comprises a plurality of input buffers, with one input buffer for each of said plurality of slot controllers.

9. An ATM network switch according to claim 8, wherein:
   said signalling means comprises means for signalling an indication of the number of ATM cells in each of said input buffers.

10. An ATM switch according to claim 1, wherein:
    said buffer control means comprises arbitration logic means for determining an order of transmission of cells stored in said buffer means to said switch fabric.

11. An ATM switch according to claim 10, wherein:
    said arbitration logic means comprises a plurality of timer means related to a plurality of priority levels of ATM cells, each of said plurality of timer means ensuring that, for its respective level of priority, a cell is not held in said buffer means for more than a predetermined time.

12. An ATM switch according to claim 2, wherein:

said buffer control means comprises arbitration logic means for determining an order of transmission of cells stored in said buffer means to said switch fabric.

13. An ATM switch according to claim 12, wherein:

said arbitration logic means comprises a plurality of timer means related to a plurality of priority levels of ATM cells, each of said plurality of timer means ensuring that, for its respective level of priority, a cell is not held in said buffer means for more than a predetermined time.

14. An ATM switch according to claim 3, wherein:

said buffer control means comprises arbitration logic means for determining an order of transmission of cells stored in said buffer means to said switch fabric.

15. An ATM switch according to claim 14, wherein:

said arbitration logic means comprises a plurality of timer means related to a plurality of priority levels of ATM cells, each of said plurality of timer means ensuring that, for its respective level of priority, a cell is not held in said buffer means for more than a predetermined time.

16. An ATM switch according to claim 6, wherein:

said buffer control means comprises arbitration logic means for determining an order of transmission of cells stored in said buffer means to said switch fabric.

17. An ATM switch according to claim 16, wherein:

said arbitration logic means comprises a plurality of timer means related to a plurality of priority levels of ATM cells, each of said plurality of timer means ensuring that, for its respective level of priority, a cell is not held in said buffer means for more than a predetermined time.

18. An ATM switch according to claim 16, wherein:

said arbitration logic means comprises a first register for storing a plurality of said indications, a second register for storing a previous plurality of said indications, comparison means for comparing contents of said first register and said second register and providing a comparison indication, and logic means for choosing a cell in one of said input buffers for output to said switch fabric based on said comparison indication.

* * * * *